United States Patent
Brown

(10) Patent No.: US 7,716,398 B2
(45) Date of Patent: May 11, 2010

(54) BIFURCATE BUFFER

(75) Inventor: David Brown, Carp (CA)

(73) Assignee: IDT Canada Inc., Ottawa (CA)

( * ) Notice: Subject to any disclaimer, the term of this patent is extended or adjusted under 35 U.S.C. 154(b) by 96 days.

(21) Appl. No.: 12/004,500

(22) Filed: Dec. 20, 2007

(65) Prior Publication Data

US 2008/0174344 A1 Jul. 24, 2008

Related U.S. Application Data

(60) Provisional application No. 60/870,868, filed on Dec. 20, 2006.

(51) Int. Cl.
G06F 3/00 (2006.01)
G11C 7/10 (2006.01)

(52) U.S. Cl. .................... 710/52; 365/189.05

(58) Field of Classification Search ............. 710/52
See application file for complete search history.

(56) References Cited

U.S. PATENT DOCUMENTS

| 5,305,321 | A * | 4/1994 | Crayford ............ 370/389 |
| 5,923,662 | A * | 7/1999 | Stirling et al. ........ 370/432 |
| 6,798,784 | B2 * | 9/2004 | Dove et al. .......... 370/463 |
| 2002/0029270 | A1 * | 3/2002 | Szczepanek .......... 709/225 |
| 2003/0031209 | A1 * | 2/2003 | Regev et al. ......... 370/503 |
| 2004/0028164 | A1 * | 2/2004 | Jiang et al. ......... 375/371 |

FOREIGN PATENT DOCUMENTS

WO WO 9962231 A1 * 12/1999

OTHER PUBLICATIONS

Igor Radusinovic et al., "Bifurcated Buffering in Internal Buffer Banyan ATM Switch," Copyright 1999, IEEE, pp. 442-446.*
Hong Xao et al., "A Novel ATM Switching Fabric," Oct. 18-22, 2009, IEEE, vol. I, pp. 287-290. http://ieeexplore.ieee.org/stamp/stamp.jsp?isnumber=17837&arnumber=824523&punumber=6648.*
Hakyong Kim et al., "Throughput analysis of bifurcated input-queued packet switches with restricted contention," Aug. 20, 1998, IEEE, vol. 34, Issue 17; pp. 1651-1652. http://ieeexplore.ieee.org/stamp/stamp.jsp?isnumber=15450&arnumber=715271&punumber=2220.*

* cited by examiner

Primary Examiner—Tariq Hafiz
Assistant Examiner—Dayton Lewis-Taylor
(74) Attorney, Agent, or Firm—Bever Hoffman & Harms LLP

(57) ABSTRACT

A buffer includes a plurality of serial inputs, a plurality of de-serializers, each coupled to a respective input, a plurality n of buffers and a media access controller having inputs coupled to the plurality of de-serializers, data outputs coupled to the buffers, and two control outputs coupled to respective buffers for buffering input data at a clock rate one-nth that of the input data. Preferably the buffer is a bifurcate buffer. In operation, serial packets are received on a port. They must be converted to parallel data for processing by conventional CMOS logic, however there are limits serial to parallel conversion ratio. This buffer describe circumvents theses limits.

9 Claims, 9 Drawing Sheets

BIFURCATE BUFFER

RELATED APPLICATIONS

This application claims the benefit of U.S. Provisional Patent Application No. 60/870,868, filed on Dec. 20, 2006, by the same inventor, which is incorporated herein by reference in its entirety.

FIELD OF THE INVENTION

The present invention relates to bifurcate buffers and is particularly concerned with very high speed switch buffers.

BACKGROUND OF THE INVENTION

Peripheral Component Interconnect Express, PCIe 2.0 specifies 5.0 Gigbit/s symbol rate per lane. Multiple lanes can be used to fabricate larger port bandwidths. For example, x4 port would have an aggregate symbol rate of 20 G, and a bit rate of 16 G, 8b10b coding is used. A x8 port would have an aggregate symbol rate of 40 G, and a bit rate of 32 G. There are other serial interconnect protocols, for example serial rapid IO and Ethernet that have similar properties. This disclosure will focus on PICe, but is not limited to that protocol.

Referring to FIG. 1, there is illustrated a PCIe packet. The diagram is copied from PCIe specification. The PCIe packet 10 includes a framing byte 12, a two-byte sequence number 14, a header 16, data 18, a 4-byte ECRC 20, a 4-byte LCRC 22 and a final framing byte 24, all of which form a physical layer 26. The two-byte sequence number 14, the header 16, data 18, the 4-byte ECRC 20, and the 4-byte LCRC 22 form a data link layer 27. The header 16, data 18 and the 4-byte ECRC 20 form a transaction layer 28. The data 18 and the 4-byte ECRC 20 are optional, hence are shown in dashed line.

The numbers of bytes (actually a 10 bit symbol on the serial link) is shown in FIG. 1. The framing bytes, start 12 and stop 24 can be discarded by the internal logic as they are only useful for synchronizing the link to the symbol time at the receiver. The sequence number 14 only exists on the link. This is only useful to the data link layer 27, to assure that all packets are received, and in order. Although the LCRC 22 (link CRC) is valid for the link, it can be useful to monitor data integrity through a switch, or other such device.

The simplest way to convert this serial packet to a parallel bus for on chip processing is shown in FIG. 2. The 10-bit symbols at 5 G/s are converted to 8-bit data at 500 Mbits/s by SERDES (serialize/de-serialize) 30. Note that the start of packet (SOP) must always occur on lane 0. The parallel data is written 32 into a data buffer, running at the same clock rate as the 500M byte rate. It may be feasible to implement the MAC at a clock rate of 500 MHz in 90 nm The read side of the buffer, connecting to a large internal switch fabric (ISF), will not be feasible to implement at 500 MHz clock rate. Two minimum size packets are shown 32 to consume six clock ticks, and only take four ticks to write into the data buffer 36, 38.

It is possible to have a serialize/de-serialize (SERDES) 30 that creates 16-bit wide data lanes running at half the speed. The issue then is that two packets may exist at the same time on the same clock tick. Memory management would required that different packets occupy different memory locations.

When a port bifurcates, prior art methods typically instantiate another buffer for that port. This buffer is wasted when a single 1×8 port is used.

SUMMARY OF THE INVENTION

An object of the present invention is to provide an improved bifurcate buffer.

In accordance with an aspect of the present invention there is provided a bifurcate buffer comprising a plurality of serial inputs, a plurality of de-serializers, each coupled to a respective input, a plurality n of buffers and a media access controller having inputs coupled to the plurality of de-serializers, data outputs coupled to the buffers, and two control outputs coupled to respective buffers for buffering input data at a clock rate one-nth that of the input data.

In accordance with another aspect of the present invention there is provided a A bifurcate buffer comprising a plurality of serial inputs, a plurality of de-serializers, each coupled to a respective input, two buffers and a media access controller having inputs coupled to the plurality of de-serializers, data outputs coupled to the buffers, and two control outputs coupled to respective buffers for buffering input data at a clock rate one-half that of the input data.

In accordance with a further aspect of the present invention there is provided a A bifurcate buffer comprising a plurality of serial inputs, a plurality of de-serializers, each coupled to a respective input, two buffers and two media access controllers each having inputs coupled to one-half the plurality of de-serializers, data outputs coupled to the buffers, and a control output coupled to respective buffers for buffering input data at a clock rate one-half that of the input data.

By paralleling the data to wider widths and creating separate memories more effective use of buffers is made.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
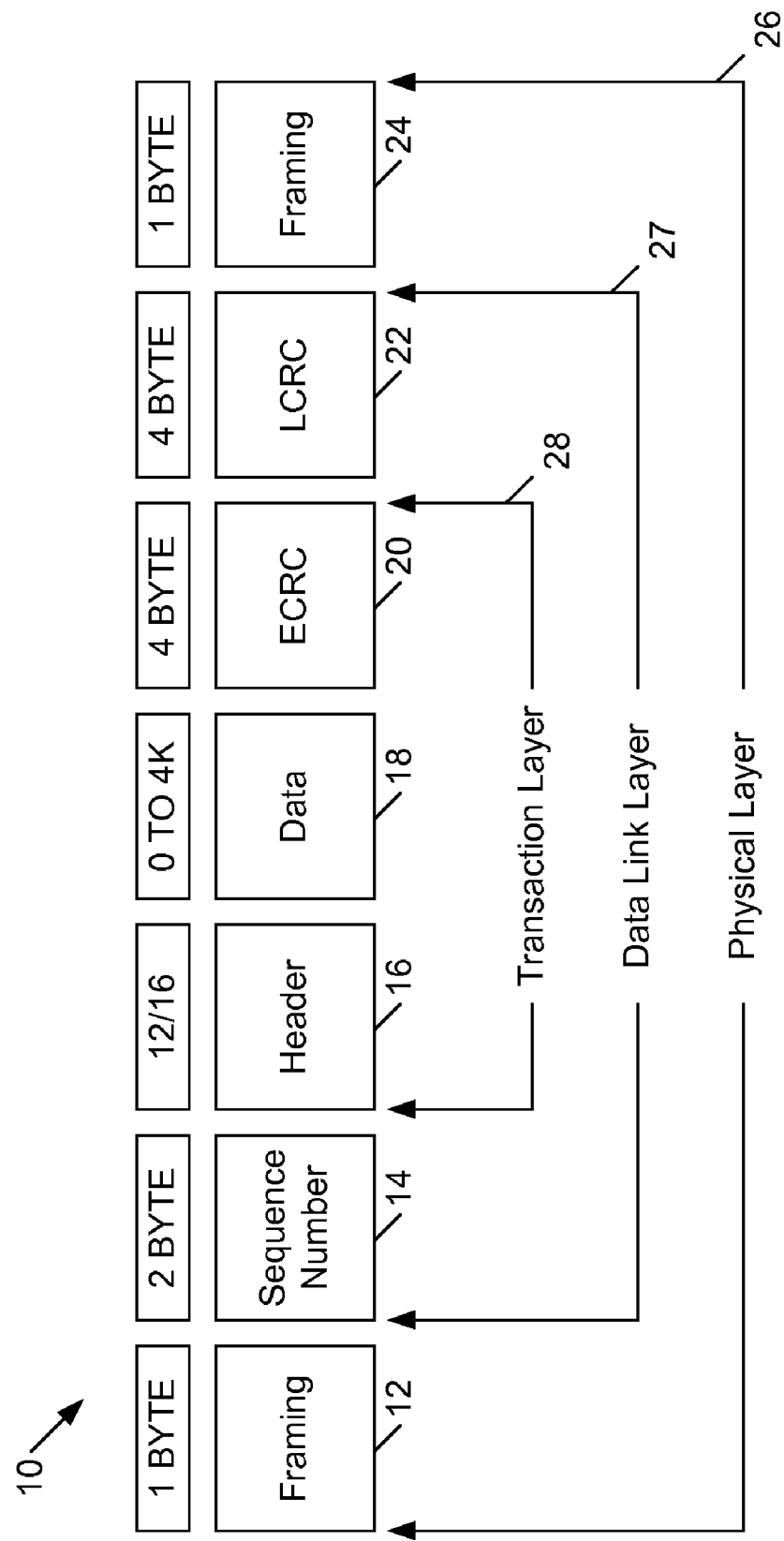
FIG. 1 illustrates a PCIe packet.
Figure 2:
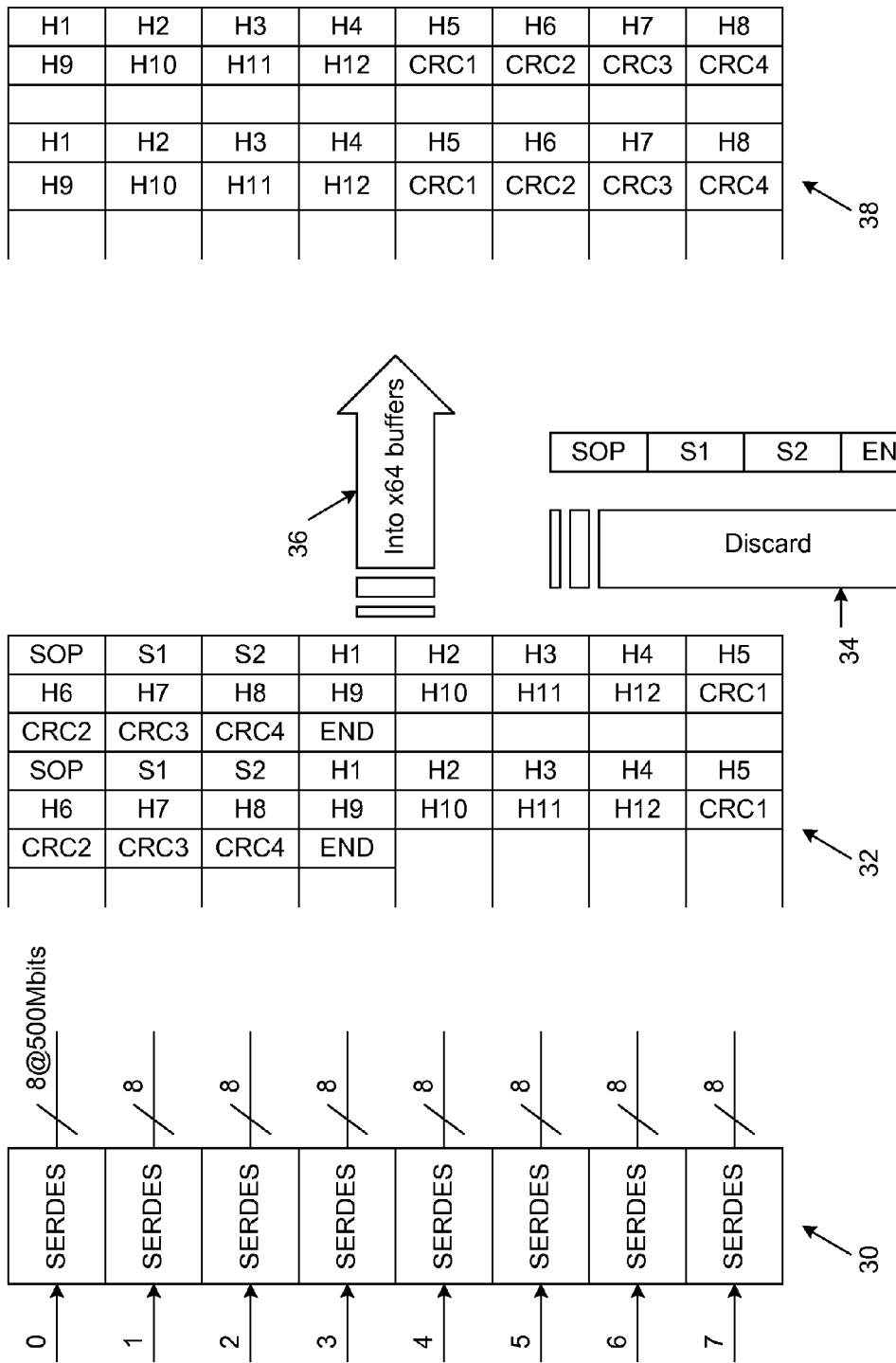
FIG. 2 illustrates a simple way to convert the serial packet of FIG. 1 to a parallel bus.
Figure 3:
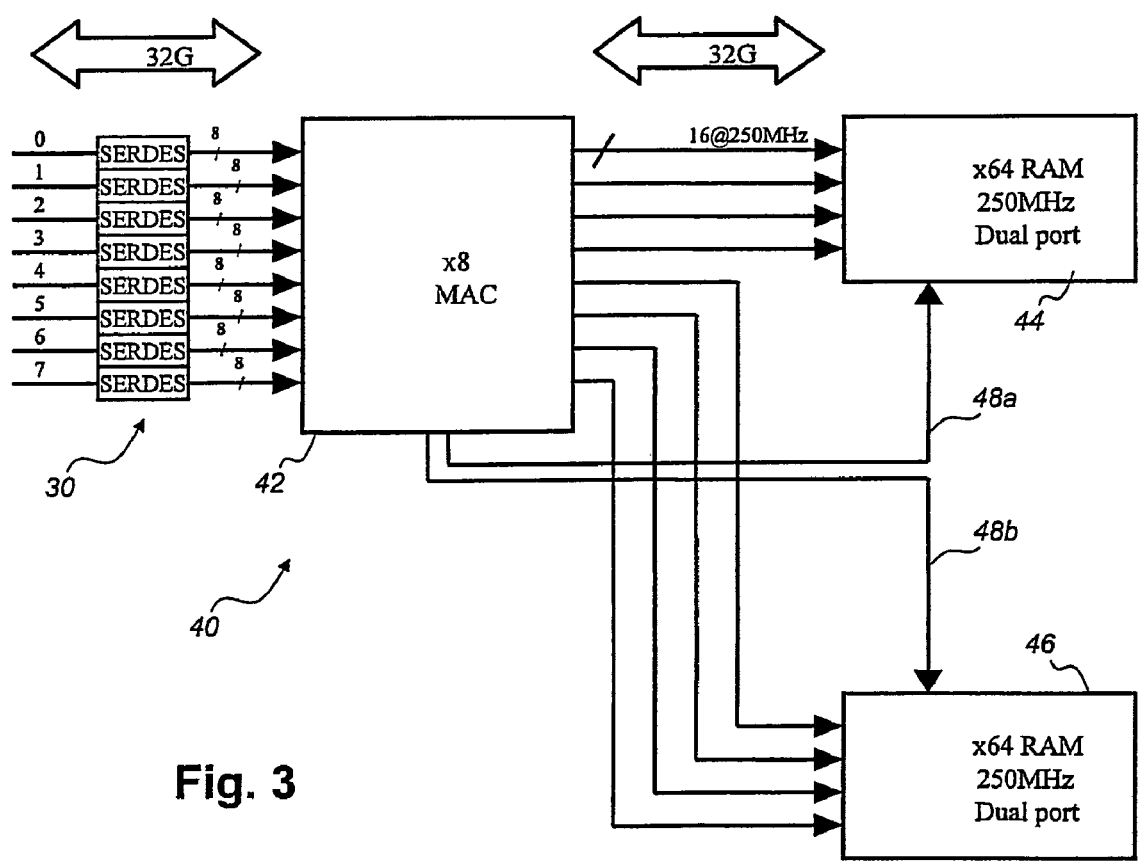
FIG. 3 illustrates a bifurcate buffer in accordance with a first embodiment of the present invention.

Referring to FIG. 3 there is illustrated a bifurcate buffer in accordance with a first embodiment of the present invention. The 1×8 bifurcate buffer 40 includes a media access controller (MAC) 42 receiving input from serializer/de-serializer (SERDES) 30 and outputting-four 16-bit wide lanes to each of x64 RAM 44 and 46, controlled by lines 48a and 48b, respectively.

In operation, the data is written into two-x64 250 MHz dual port RAM 44 and 46. The memory management generates different addresses for each bank.

Figure 4:
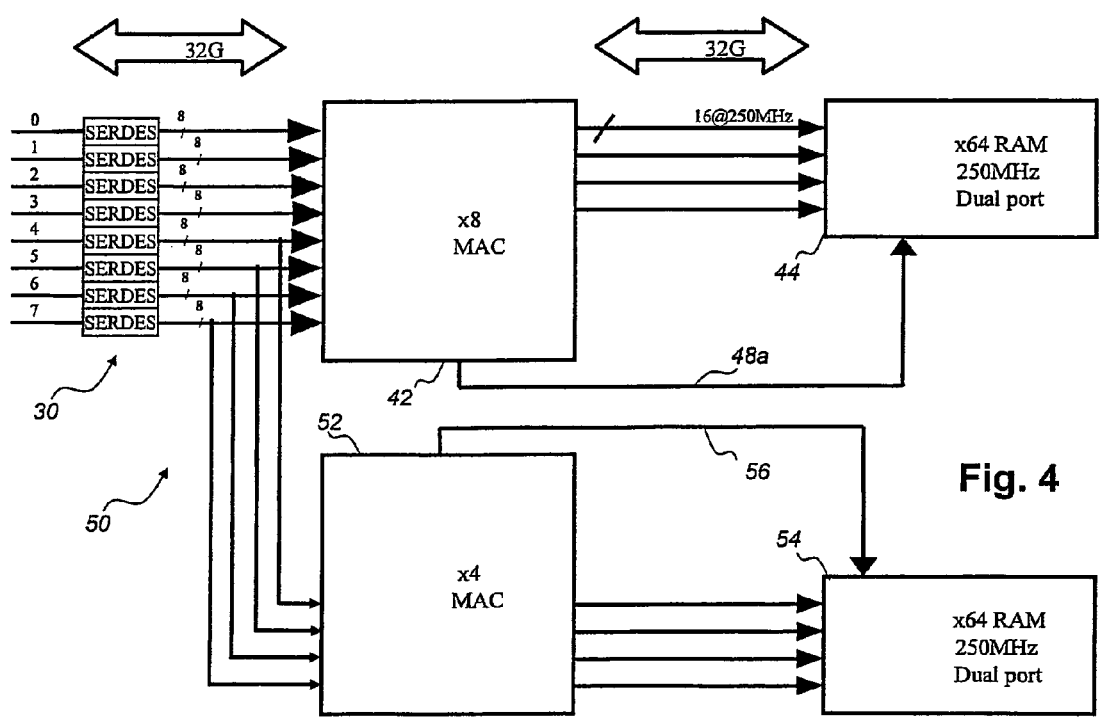
FIG. 4 illustrates a bifurcate buffer in accordance with a second embodiment of the present invention.

Referring to FIG. 4 there is illustrated a bifurcate buffer in accordance with a second embodiment of the present invention. The 2×4 bifurcate buffer 50 includes a first media access controller (MAC) 42 receiving input from serializer/de-serializer (SERDES) 30 and outputting four 16-bit wide lanes to x64 RAM 44, controlled by line 48a. The 2×4 bifurcate buffer 50 also includes a second media access controller (MAC) 52 receiving input from the lower four serializer/de-serializer (SERDES) 30 and outputting four 16-bit wide lanes to x64 RAM 54, controlled by line 56. Hence, in this example the 1×8 port 30 can bifurcate to 2×4 ports.

In operation, the upper x8 MAC 42 is configured to run in 4 mode. Here each buffer 44 and 54 is managed by its respective MAC 42 and 52.

Figure 5A:
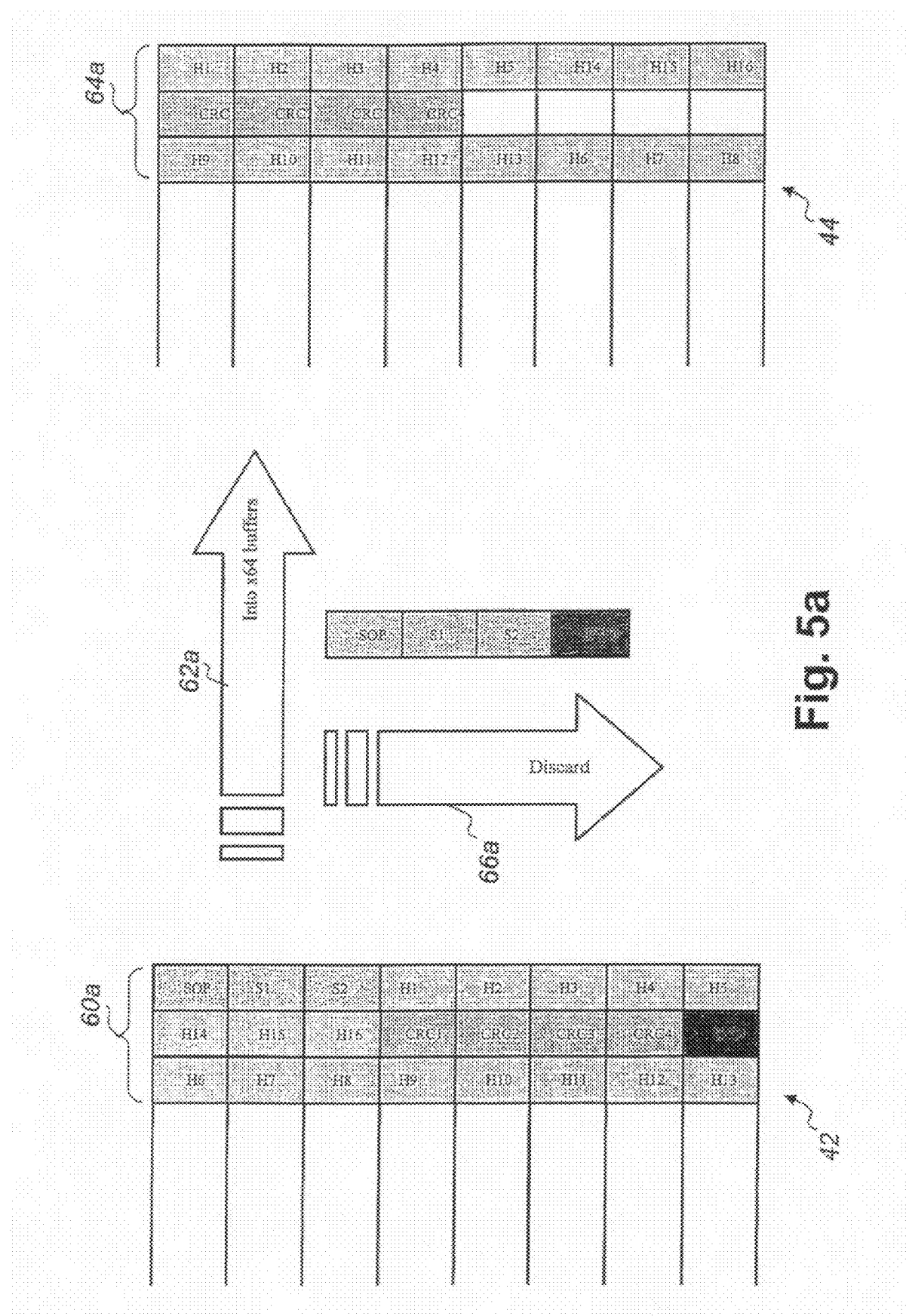
FIGS. 5a and 5b illustrate packet flow for the bifurcate buffer of FIG. 3.
Figure 5B:
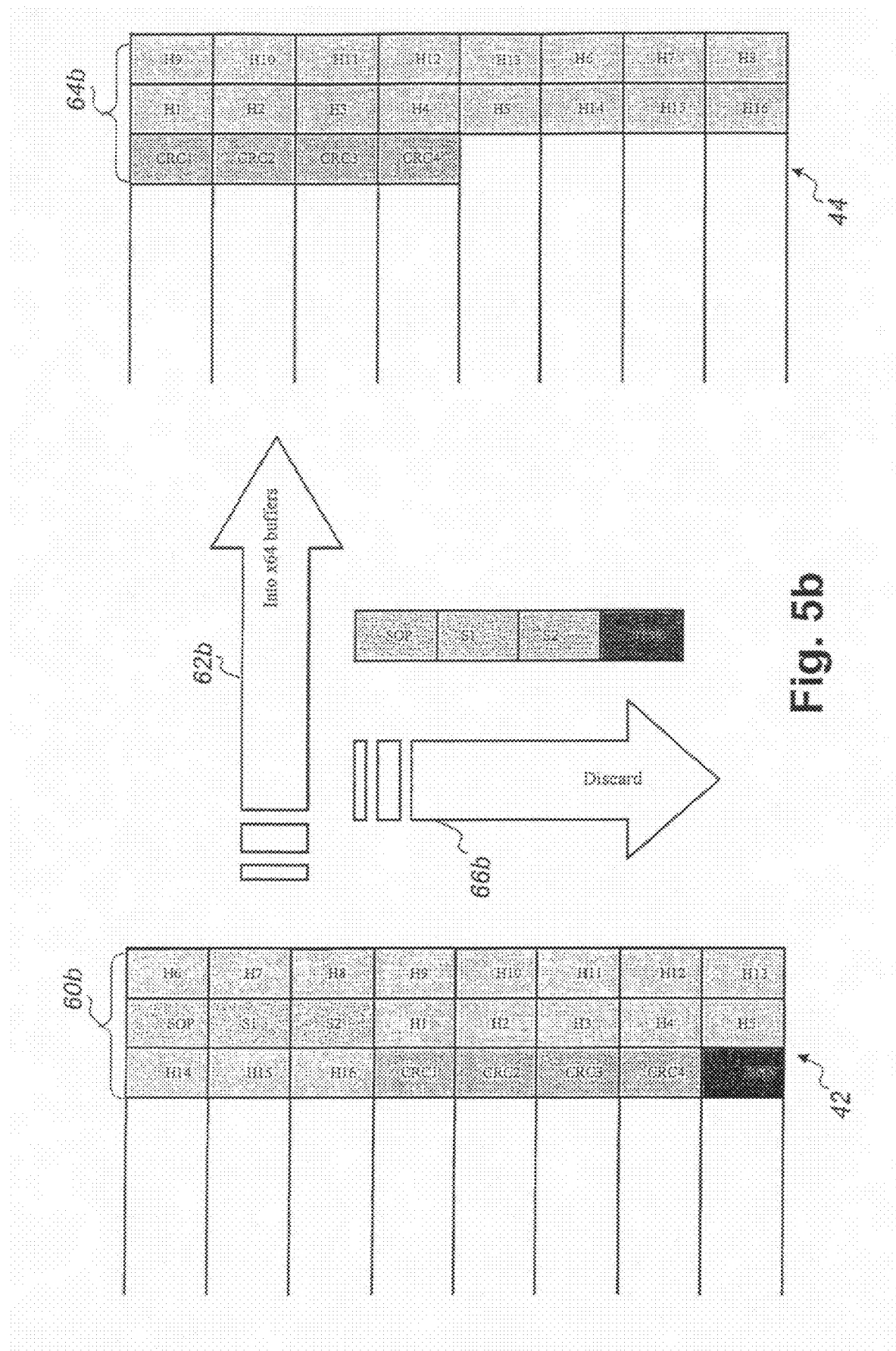

Referring to FIGS. 5a and 5b, there is illustrated packet flow for the bifurcate buffer of FIG. 3. The packet flow for 1×8 mode is shown. We can see that the two packets come in to the MAC 42 on three clock ticks 60a and 60b, and are written 62a and 62b in to the buffers 44 in three clock ticks 64a and 64b. The second clock tick contains data from two different packets. The framing bytes, start 12 and stop 24 and the sequence number 14 can now be discarded 66a and 66b by the internal logic.

Figure 6A:
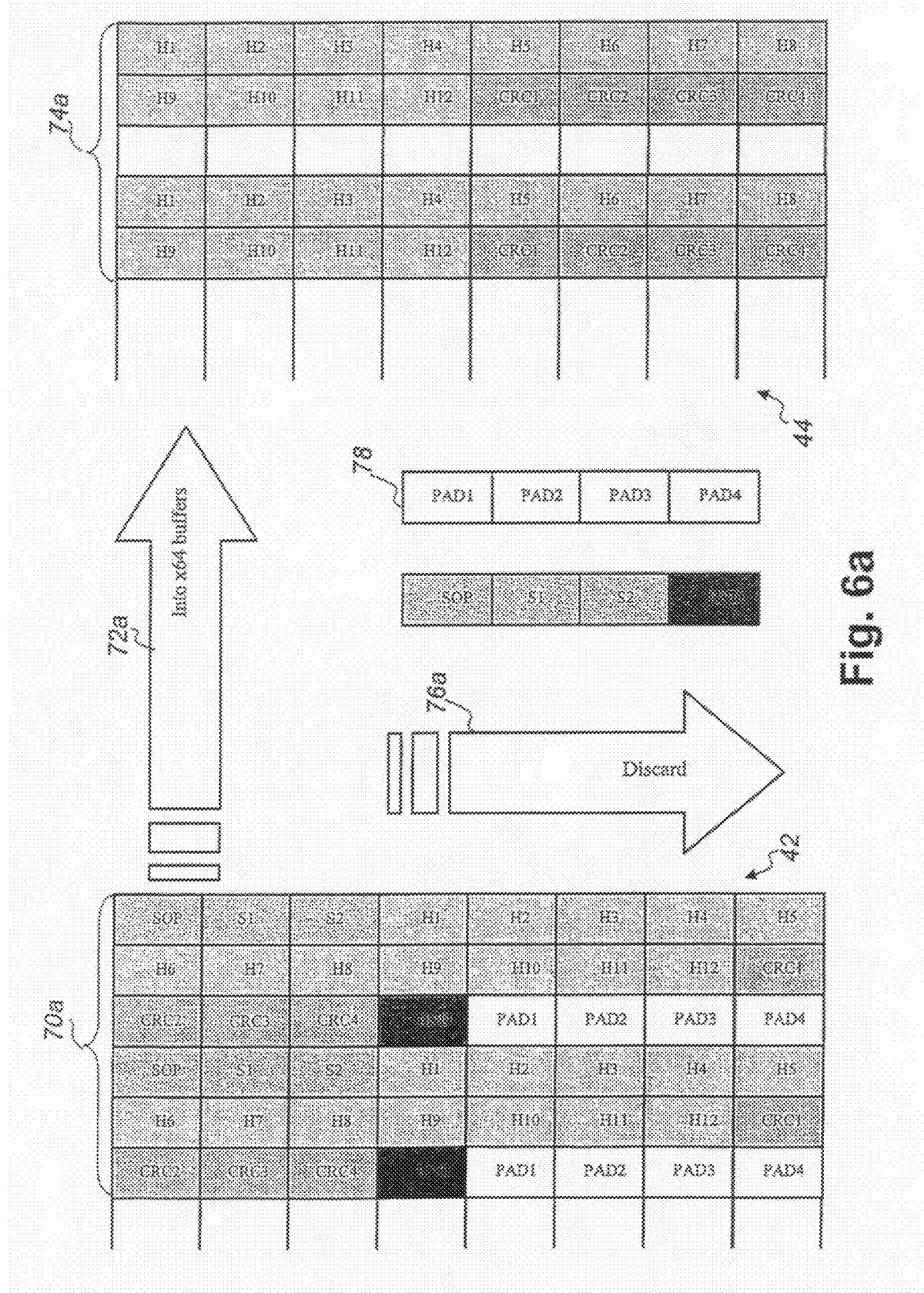
FIGS. 6a and 6b illustrate packet flow for the bifurcate buffer of FIG. 4.
Figure 6B:
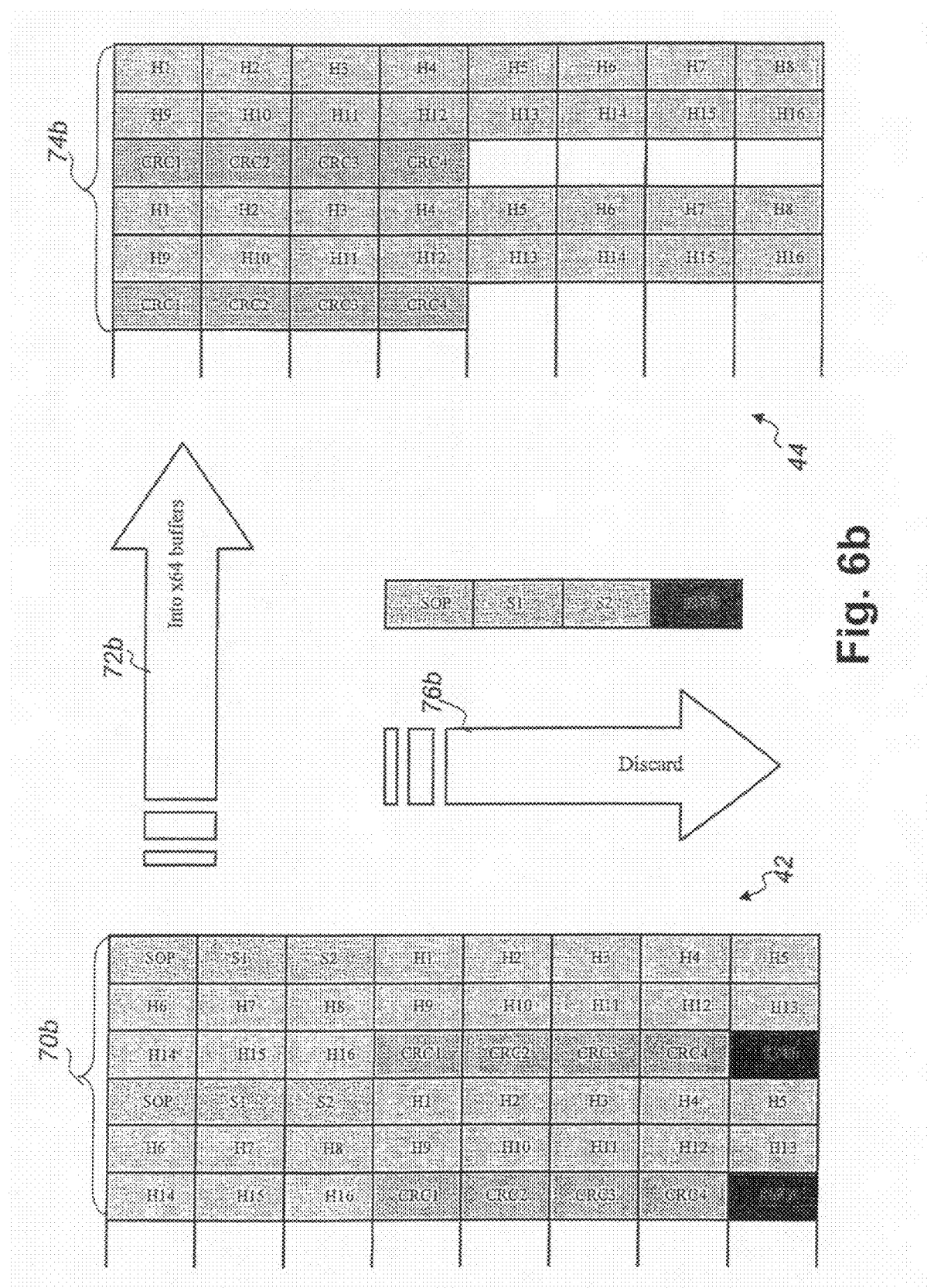

Referring to FIGS. 6a and 6b, there is illustrated packet flow for the bifurcate buffer of FIG. 4. The packet flow for 2×4 mode is shown. We can see that the two packets, on each port 42 and 52, come in on six clocks ticks 70a and 70b, and are written 72a and 72b in to buffers 44 and 54 in six clock ticks 74a and 74b. The framing bytes, start 12 and stop 24 and the sequence number 14 can now be discarded 76a and 76b by the internal logic, as is padding bytes 78.

Figure 7:
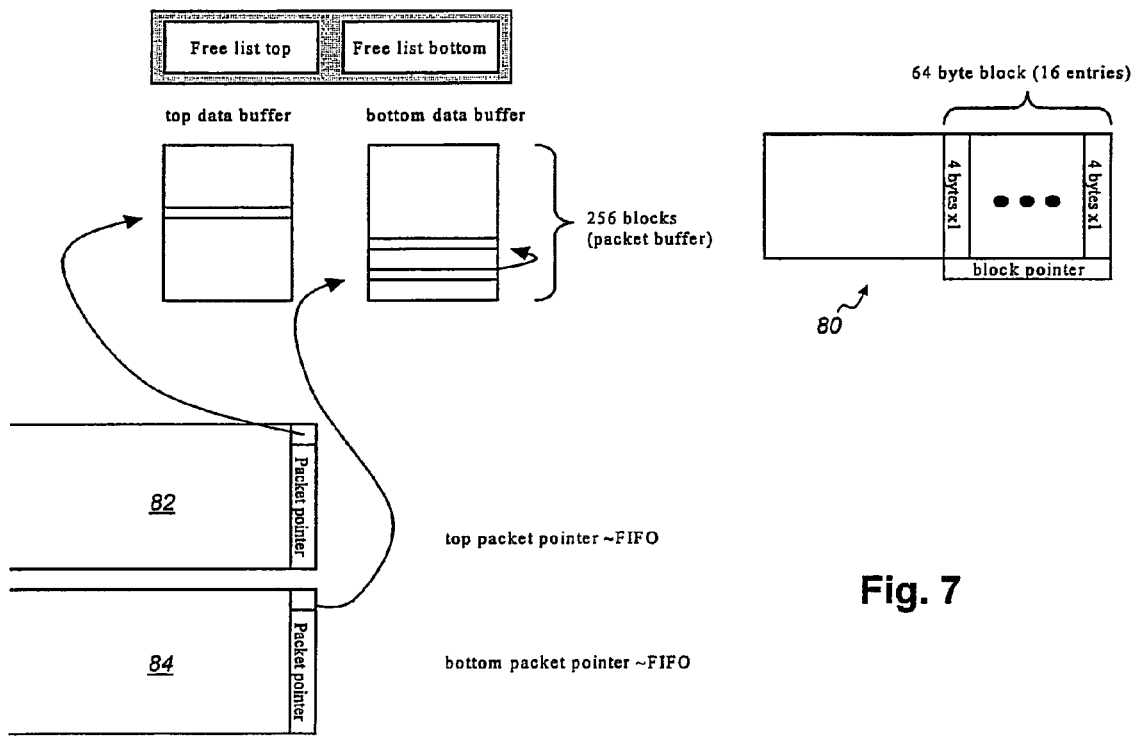
FIG. 7 illustrates an example of memory management for the bifurcate buffers.

Referring to FIG. 7, there is illustrated an example of memory management for the bifurcate buffers of FIGS. 3 and 4. The memory management scheme is described below. The underlying scheme is a link list 80 of 64 byte blocks. This scheme is well known by those skilled in the art. The actual sizes are a function of cost/performance trade offs; this is simply a typical example.

In 1×8 mode two packet pointers 82 and 84 index each packet. The 8-bit pointer also has another bit to indicate which pointer contains the first portion of the packet. This way packets can be pulled out of the buffer in order. The packet pointers are stored in a FIFO (in this example).

In 2×4 mode the packet pointer FIFOs 82 and 84 are independent.

The free lists 80 are in one physical memory, but logically contain pointers to its respective packet buffer.

The preceding, example describes a x8 5 Gig PICe port that can bifurcate to 2×4 5 Gig PCIe ports. The present embodiment can be adapted to other speeds, port segmentations for example quad-furcation, and protocols, to provide the benefit there from.

Numerous modifications, variations and adaptations may be made to the particular embodiments described above without departing from the scope patent disclosure, which is defined in the claims.

What is claimed is:

1. A buffer comprising:
   a plurality of N serial inputs;
   a plurality of N de-serializers, each coupled to a respective one of the N serial inputs, and each configured to convert serial data received on the respective one of the N serial inputs into M-bit parallel data, whereby the plurality of N de-serializers provide a plurality of N M-bit parallel data outputs, wherein data is transferred by the plurality of N M-bit parallel data outputs at a first bit rate;
   a first dual-port buffer;
   a second dual-port buffer; and
   a media access controller coupled to receive the N M-bit parallel data outputs from the plurality of N de-serializers, wherein the media access controller simultaneously transfers data received from the plurality of N de-serializers to the first dual-port buffer and the second dual-port buffer, wherein the media access controller uses separate control outputs to control the first and second dual-port buffers, wherein data is transferred at a second bit rate to the first dual-port buffer on a first set of lanes having a width of N×M, and wherein data is transferred at the second bit rate to the second dual-port buffer on a second set of lanes having a width of N×M, wherein the second bit rate is half of the first bit rate.

2. The buffer of claim 1, wherein the first set of lanes and the second set of lanes each includes N/2 lanes, each having a width of 2×M bits.

3. The buffer of claim 1, wherein data is transmitted from the plurality of N de-serializers to the media access controller in response to a first clock signal, and wherein data is transmitted from the media access controller to the first dual-port buffer and the second dual-port buffer in response to a second clock signal, wherein the first clock signal has a frequency that is two times a frequency of the second clock signal.

4. The buffer of claim 1, wherein the media access controller generates different addresses for the first dual-port memory and the second dual-port memory.

5. The buffer of claim 1, wherein the plurality of N de-serializers implement a 1×N port.

6. The buffer of claim 5, further comprising:
   a first packet pointer that indexes a packet in the first dual-port buffer; and
   a second packet pointer that indexes the packet in the second dual-port buffer, wherein the first and second packet pointers each include a bit to whether the first packet pointer or the second packet pointer indexes a first portion of a packet.

7. A buffer comprising:
   a first set of N serial inputs and a first set of N de-serializers configured to operate as a first port wherein the first set of N de-serializers provides a first set of N M-bit parallel data outputs a first bit rate;
   a second set of N serial inputs and a second set of N de-serializers configured to operate as a second port wherein the second set of N de-serializers provides a second set of N M-bit parallel data outputs the first bit rate;
   a first dual-port buffer;
   a second dual-port buffer;
   a first media access controller coupled to receive the first and second sets of N M-bit parallel data outputs from the first and second sets of N de-serializers, wherein the first media access controller transfers data received the first set of N de-serializers to the first dual-port buffer at the first bit rate on a first set of lanes having a width of 2×N×M; and
   a second media access controller coupled to receive the second set of N M-bit parallel data outputs from the second set of N de-serializers, wherein the second media access controller transfers data received from a second set of N de-serializers to the second dual-port buffer at the first bit rate on a second set of lanes having a width of 2×N×M, wherein the first media access controller and the second media access controller use separate control outputs to control the first dual-port buffer and second dual-port buffer, respectively.

8. The buffer of claim 7, wherein the first set of lanes and the second set of lanes each includes N lanes, each having a width of 2×M bits.

9. The buffer of claim 7, wherein data is transmitted from the first and second sets of N de-serializers to the first and second media access controllers in response to a first clock signal, and wherein data is transmitted from the first and second media access controllers to the first and second dual-port buffers in response to a second clock signal, wherein the first clock signal has a frequency that is two times a frequency of the second clock signal.

* * * * *